United States Patent Office.

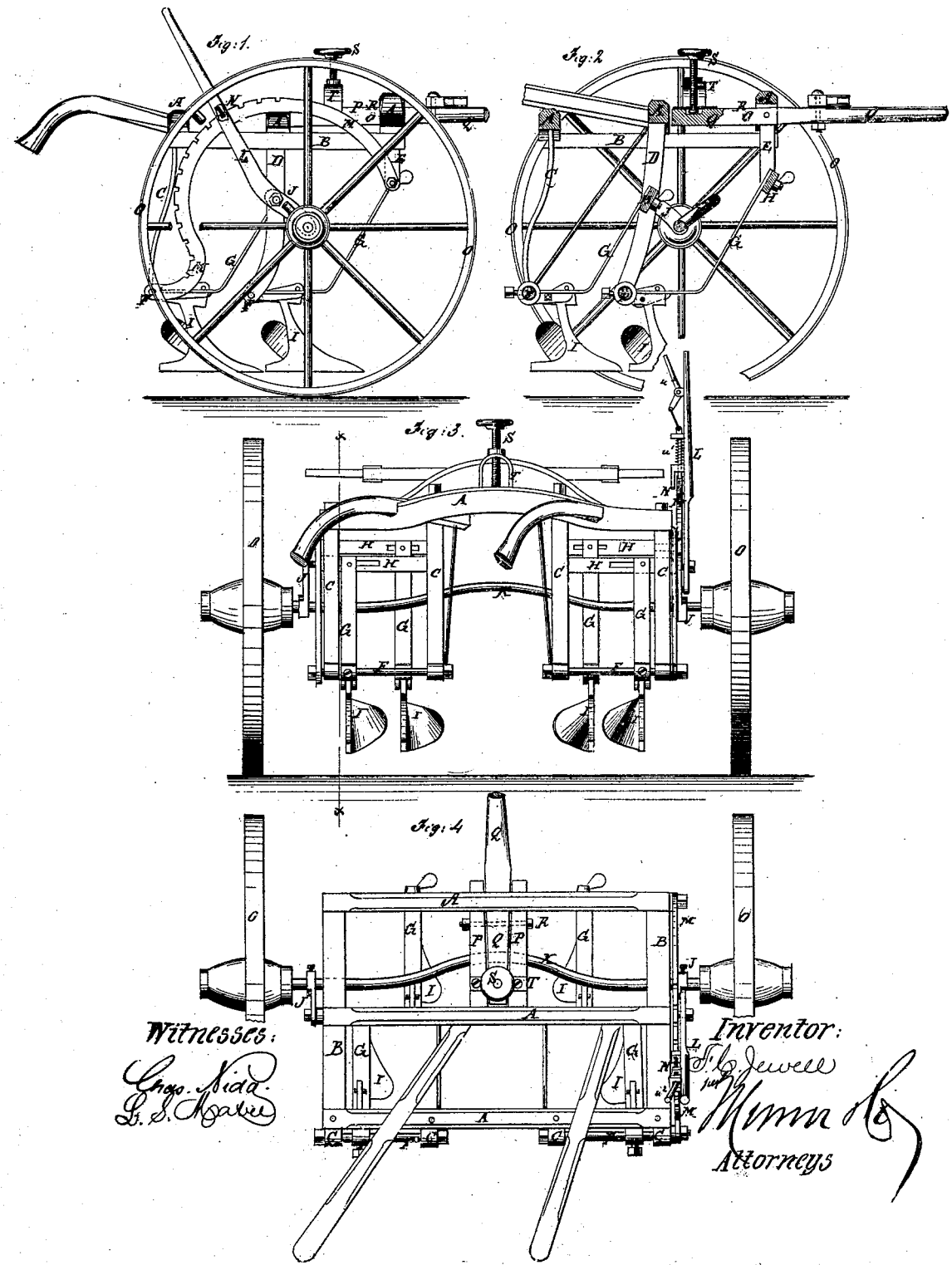

FREEMAN C. JEWELL, OF RAHWAY, NEW JERSEY.

Letters Patent No. 110,046, dated December 13, 1870.

IMPROVEMENT IN CULTIVATORS.

The Schedule referred to in these Letters Patent and making part of the same.

*To all whom it may concern:*

Be it known that I, FREEMAN C. JEWELL, of Rahway, in the county of Union and State of New Jersey, have invented a new and useful Improvement in Cultivators; and I do hereby declare that the following is a full, clear, and exact description thereof, which will enable others skilled in the art to make and use the same, reference being had to the accompanying drawing forming part of this specification, in which—

Figure 1 is a side view of my improved cultivator.

Figure 2 is a vertical longitudinal section of the same, taken through the line $x\ x$, fig. 3.

Figure 3 is a rear view of the same.

Figure 4 is a top view of the same.

Similar letters of reference indicate corresponding parts.

My invention has for its object to furnish an improved cultivator, simple in construction, easily operated, and effective in operation, and which shall be so constructed that it can be readily and quickly adjusted as circumstances may require; and It consists in the construction and combination of the various parts, as hereinafter more fully described.

A B is the frame of the machine, the three cross-bars, A, of which are rigidly and securely connected at their ends by being attached to the two side bars B. The middle part of the cross-bars A is bowed or curved upward, to enable the machine in cultivating tall plants to pass over said plants without injuring them.

C are two pairs of downwardly-projecting arms, the upper ends of which are attached to the end or horizontal parts of the rear cross-bar A.

To the end or horizontal parts of the middle cross-bar A are attached the upper ends of two pairs of similar arms D, and to the end or horizontal parts of the forward cross-bar A are attached the upper ends of two pairs of short downwardly-projecting arms E.

The lower ends of each pair of the arms C and D are connected by a rod or bar, F, the ends of which are secured to the ends of the said arms C D by nuts.

G are the plow-beams, the rear ends of which have eyes formed in them to receive and slide upon the rods F, to which they are secured when adjusted by set-screws, as shown in the drawing.

The rear parts of the beams G are horizontal, or nearly so, and their forward parts are inclined upward and have bolts attached to or connected with them, which pass through horizontal slots formed in the bars H, which are attached to the middle parts of the pairs of arms D, and the lower ends of the pairs of short arms E, so that by tightening the hand-nuts screwed upon the said bolts the forward ends of the plow-beams may be firmly and adjustably secured in place.

By this construction, by simply loosening the said set-screws and hand-nuts, the two plows upon each side of the machine may be adjusted to work closer together or farther apart; or the plows may be adjusted to run closer to or farther from the row of plants being cultivated.

The rear or horizontal parts of the plow-beams G are slotted longitudinally to receive the upper ends of the plow-standards, and are made thick or have downwardly-projecting flanges formed upon their lower sides along the edges of the said slots to give a wide lateral bearing to the said plow-standards to sustain any lateral strain upon the plows, and hold them always in a vertical position.

I are the plows, the upper ends of the standards of which project in front and rear, as shown in figs. 1 and 2.

The rear ends of the tops of the standards of the plows I are securely pivoted to the rear part of the beams G, by means of bolts and nuts, as shown in the drawing, and their forward ends project above the said beams, and have wooden pins passed through them, the ends of which rest upon the upper sides of the beams G. The said wooden pins should be of sufficient strength to sustain the ordinary strain in using the cultivator; but should the plows I strike an obstruction the said pins will break and allow the plows to turn back, thus preventing the plow from being broken.

To the middle parts of the outer arms D are pivoted the ends of the connecting-bars J, the other ends of which have holes formed through them to receive the axle K, to which they are adjustably secured by set-screws, as shown in fig. 4.

By this construction the weight of the machine will be suspended from and in the rear of the axle K, so that the weight of a rider will not be required to hold the machine to its work.

To one of the connecting or crank-arms J is securely bolted a lever, L, which projects to the rearward into such a position that it may be conveniently reached and operated by the operator.

M is a curved catch-bar, the rear end of which is bolted to the lower end of the rear arm C, or rod F, and the forward end of which is bolted to the lower end of the short bar or arm E.

The curved bar M is notched or toothed upon its outer or convex edge to receive the engaging end of the catch N, which is held down against the notched bar M by the spring $n^1$, and is raised to allow the machine to be adjusted by the lever $n^2$.

The catch N $n^1$ $n^2$ is attached to the side of the lever L, which passes along the side of the said catch-bar M. By this construction, by operating the lever L, the frame-work of the machine, and with it the plows, may be raised from the ground or lowered, so that the plows may work at any desired depth in the ground.

The middle part of the axle K is curved or bowed, as shown in figs. 2, 3, and 4, and the bars or cranks J are so connected with it that when the plows are lowered into a working position the bend or bow of the axle may be upward, so that the said axle may pass over tall plants without injuring them.

O are the wheels, which are connected with and revolve upon the journals of the axle K in the ordinary manner.

P are the hounds, the ends of which are secured to the front and middle cross-bars of the frame, and to and between which the rear end of the tongue Q is pivoted by a bolt, R, as shown in fig. 4.

S is a hand-screw, the lower or forward end of which is swiveled to the rear end of the tongue Q, and which works in a screw-hole formed in the curved arm or bracket T, the ends of which are secured to the hounds P, so that by means of the hand-screw S the relative position of the frame A B, and the line of draft may be adjusted at will to regulate the pitch of the plows.

Having thus described my invention,

I claim as new, and desire to secure by Letters Patent—

1. A cultivator-frame, formed of the bars B and upwardly-curved cross-bars A, the arms C D E, and rods F, when constructed and adjusted together as described.

2. The beams G, slotted bars H, and the plow-standards, combined with a vibratory frame A B C D E F, to adjust the pitch of the plows, as described.

3. The slotted and bent plow-beams, having their rear slotted parts thickened or flanged, in combination with the rods F, slotted bars H, and the standards of the plows I, substantially as herein shown and described, and for the purpose set forth.

4. The upper ends of the standards of the plows I, constructed substantially as herein shown and described, to adapt them for attachment to the slotted beams G, substantially as herein shown and described, and for the purpose set forth.

5. The arms D E F, crank-arms J, bowed axle K, lever L, bar M, and catch N $n^1$ $n^2$, when all are combined and adjusted together, as and for the purpose described.

The above specification of my invention signed by me this 16th day of August, 1870.

FREEMAN C. JEWELL.

Witnesses:
JAMES T. GRAHAM,
T. B. MOSHER.